United States Patent
Amarittapark

(10) Patent No.: US 10,154,323 B2
(45) Date of Patent: *Dec. 11, 2018

(54) REDUCTION OF NETWORK CONNECTIVITY GAPS EXPERIENCED BY INLINE NETWORK APPLIANCES

(71) Applicant: Gigamon Inc., Santa Clara, CA (US)

(72) Inventor: Sitti Amarittapark, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,872

(22) Filed: Dec. 1, 2017

(65) Prior Publication Data

US 2018/0103304 A1  Apr. 12, 2018

Related U.S. Application Data

(63) Continuation of application No. 15/257,743, filed on Sep. 6, 2016, now Pat. No. 9,860,616.

(51) Int. Cl.
*H04J 14/00* (2006.01)
*H04Q 11/00* (2006.01)
*H04B 10/2581* (2013.01)

(52) U.S. Cl.
CPC ..... *H04Q 11/0005* (2013.01); *H04B 10/2581* (2013.01); *H04Q 2011/005* (2013.01); *H04Q 2011/0015* (2013.01); *H04Q 2011/0039* (2013.01)

(58) Field of Classification Search
CPC ....... H04Q 11/0005; H04Q 2011/0015; H04Q 2011/0039; H04Q 2011/0083; H04Q 2011/0086; H04Q 2011/005; H04B 10/2581; H04L 49/254; H04L 49/3072; H04L 49/351
USPC .......................................................... 398/45
See application file for complete search history.

(56) References Cited

U.S. PATENT DOCUMENTS

| | | | | |
|---|---|---|---|---|
| 6,999,651 | B2* | 2/2006 | Qian | G02B 6/3588 385/15 |
| 7,903,968 | B2* | 3/2011 | Hung | H04B 10/032 370/227 |
| 9,673,896 | B2* | 6/2017 | Storey | H04B 10/0773 |
| 9,722,955 | B2* | 8/2017 | Nguyen | H04L 63/1408 |
| 2017/0214566 | A1* | 7/2017 | Sufleta | H04L 41/0654 |

* cited by examiner

*Primary Examiner* — M. R Sedighian
(74) *Attorney, Agent, or Firm* — Perkins Coie LLP

(57) ABSTRACT

A network appliance may include a signal splitter that splits an incoming signal into multiple portions. The signal splitter can direct one portion of the incoming signal to a switching fabric and another portion of the incoming signal to an optical switch. By monitoring the power intensity of the portion of the incoming signal received by the switching fabric, the network appliance can seamlessly switch between a bypass traffic path and a pass-through traffic path without losing network traffic caused by gaps in network connectivity. Such a configuration also enables the network appliance to maintain an accurate record of the logical connectivity state even when the network appliance is in the bypass state (i.e., when network traffic bypasses the switching fabric of the network appliance).

20 Claims, 7 Drawing Sheets

REDUCTION OF NETWORK CONNECTIVITY GAPS EXPERIENCED BY INLINE NETWORK APPLIANCES

CROSS-REFERENCE TO RELATED APPLICATION

This application is a continuation of U.S. patent application Ser. No. 15/257,743, filed Sep. 6, 2016, which is incorporated by reference herein in its entirety.

FIELD OF THE INVENTION

At least one embodiment of the present disclosure pertains to systems and techniques for routing network traffic, and more particularly, to techniques for reducing the loss of network traffic caused by gaps in network connectivity.

BACKGROUND

Traffic in a computer network can be analyzed to improve real-time decision making for network operations, security techniques, etc. The traffic may be acquired at numerous entry points by a variety of devices and/or applications (collectively referred to as "nodes" in the computer network) to provide extensive visibility of traffic flow and network security. Given the complexity and volume of traffic routed through many infrastructures, the traffic is often routed through one or more network appliances that are connected to various kinds of network tools. Examples of such network tools include an intrusion detection system (IDS) and an intrusion prevention system (IPS).

A network appliance can operate as an in-band (i.e., "inline") device or an out-of-band device. Out-of-band devices operate outside of the path of data traffic between an origination node and a destination node and receive copies of the data packets that make up the traffic, rather than the original data packets. Out-of-band devices are able to freely modify the copies of the data packets because the original data packets are allowed to traverse the network unimpeded. Inline devices, on the other hand, operate within the path of data traffic between an origination node and a destination node and receive and forward the original data packets.

Because inline network appliances reside within the path of data traffic, connectivity issues affecting inline network appliances can degrade the functionality of the computer network as a whole. For example, the path of data traffic may collapse if an inline network appliance loses power. Consequently, many inline network appliances are configured to switch between a pass-through mode and a bypass mode. However, when an inline network appliance switches from bypass mode to pass-through mode, the path of data traffic is momentarily disrupted, such that network traffic is irrecoverably lost.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

A network appliance may be a node in a computer network that can be configured to receive data packets from one or more other nodes within the computer network. Often, these data packets are transmitted to the network appliance via a fiber optic cable in the form of an optical signal. In some embodiments, the network appliance is coupled to a network tool, such as an IDS or IPS configured to analyze the data packets (or copies of the data packets), monitor the traffic within the computer network, and/or attempt to block or stop the transmission of abnormal (e.g., malicious) data packets.

The network appliance may be operable as an inline device and/or an out-of-band device. Inline network appliances are configured to receive data packets from one or more other nodes within a computer network and reside within the path of data traffic. Consequently, any interruptions to an inline network appliance's ability to manage the network traffic (e.g., due to security vulnerabilities or loss of power) affect the functionality and availability of a traffic path and can compromise the computer network as a whole.

Figure 1:
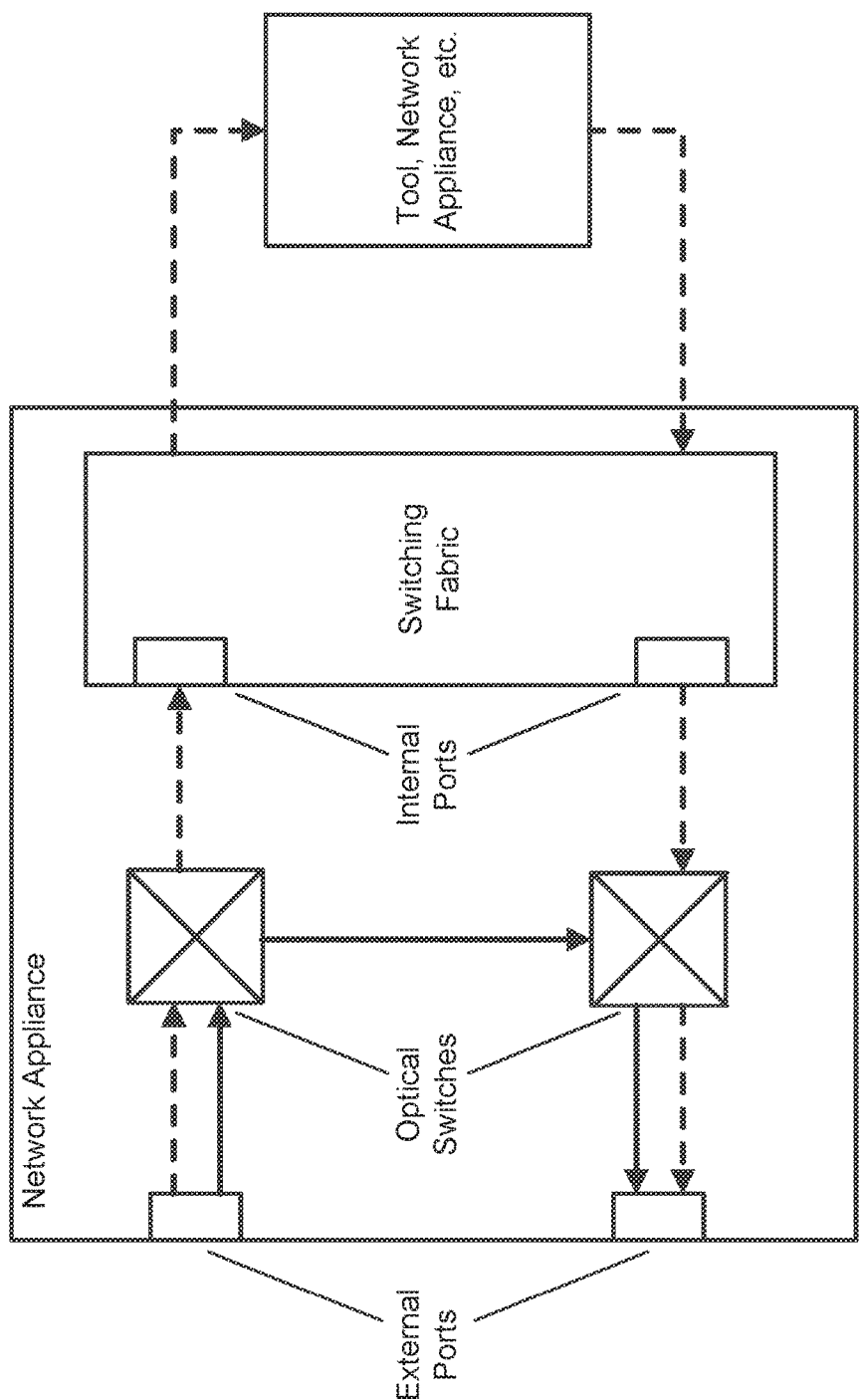
FIG. 1 depicts an inline network appliance that uses optical switches to form a bypass traffic path.

Therefore, inline network appliances are often designed to function in one of several different modes (e.g., a pass-through mode and a bypass mode) at any given time. As shown in FIG. 1, each mode corresponds to a different traffic path within the network appliance between one or more external ports and one or more internal ports. For example, the network appliance may normally operate in the pass-through mode and forward network traffic along a pass-through traffic path (shown by the dotted line). However, when the network appliance detects an interruption (e.g., loses power), the network appliance may switch to the bypass mode and forward the network traffic along a bypass traffic path (shown by the solid line).

Network appliances have conventionally switched between the pass-through traffic path and the bypass traffic path using multiple optical switches (also referred to as "relays") that are coupled to the external ports of the network appliance. These switches enable a communication signal (e.g., an optical signal received from an fiber optic cable at an external port) to be selectively switched from one traffic path to another. Thus, switches have traditionally been used in pairs to either pass network traffic downstream (e.g., to the switching fabric of the network appliance) or simply bypass the network traffic away from the network appliance.

However, when the network appliance switches between these traffic paths, the traffic flow is momentarily disrupted and data packets within the communication signal are lost. The loss consists of two different segments, a "physical loss" and a "logical loss." The physical loss is caused by the physical delay of the switch itself when the switch disengages from an existing traffic path and engages a new traffic path. After a new traffic path is established by the switch, the communication signal begins to reach an internal port of the network appliance's switching circuitry (also referred to as the "switching fabric"). But the switching fabric does not immediately forward the communication signal because the logical connectivity state of the internal port is still classified as "disconnected." Once the communication signal reaches the internal port, the network appliance begins verifying the data packets within the communication signal and then changes the logical connectivity state of the internal port to "connected," which enables the switching fabric to begin forwarding some or all of the network traffic received at the internal port (e.g., to a tool for further processing). Logical loss is caused by dropping of the network traffic that arrives at the internal port during this timeframe (i.e., when the logical connectivity state of the internal port is being changed from disconnected to connected). Logical loss is only incurred when the network appliance switches from the bypass traffic path to the pass-through traffic path. Because the network traffic dropped due to logical loss is not recoverable, it is desirable to eliminate the logical loss incurred by conventional inline network appliances.

Introduced here, therefore, are systems and techniques for eliminating the network connectivity gaps experienced by inline network appliances when switching between the bypass and pass-through traffic paths. These network connectivity gaps create instances of logical loss that cause data packets within a communication signal to be dropped. More specifically, the inline network appliances described herein replace one of the switches with an optical signal splitter that can split an incoming optical signal and feed a portion of the incoming optical signal to an internal port of the switching fabric. The portion of the incoming optical signal is fed to the switching fabric even when the inline network appliance is in the bypass state. By continually measuring power intensity of the portion of the incoming optical signal fed to the switching fabric, the inline network appliance can maintain a logical connectivity state even when in the bypass state (i.e., when network traffic is not passed downstream for further processing). Other statuses or signals may also be continually monitored or measured by the inline network appliance, such as the presence or strength of an incoming optical signal (e.g., a carrier signal), the presence or strength of a synchronization signal, etc. Moreover, the logical connectivity state of the inline network appliance can be established in listen-only mode using the portion of the incoming optical signal fed to the switching fabric by the optical signal splitter. This allows the inline network appliance to seamlessly switch between the bypass and pass-through traffic paths without experiencing disruption. In fact, implementation of the techniques described herein allows the logical loss typically incurred due to network connectivity gaps to be substantially eliminated.

General System Overview

Figure 2:
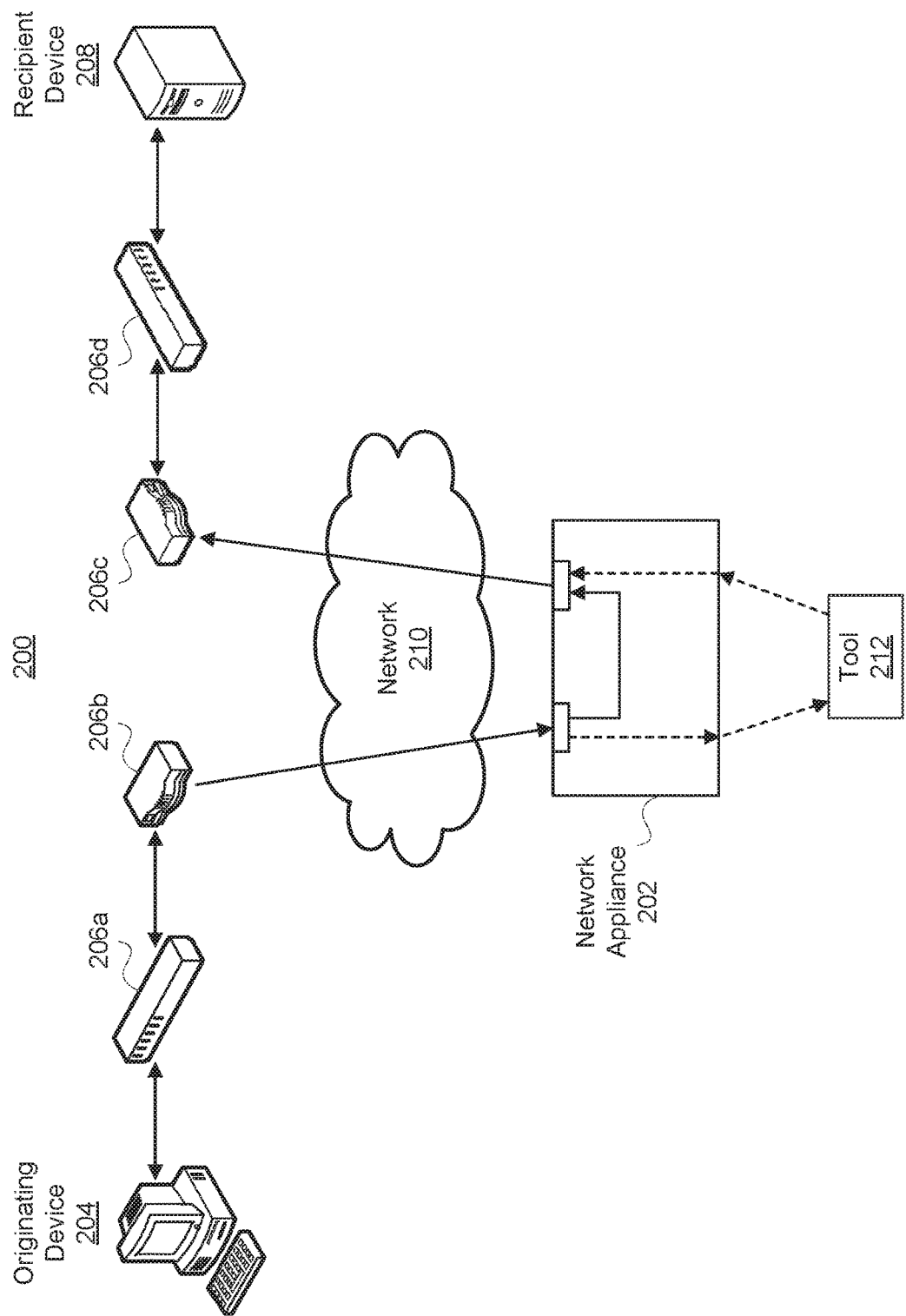
FIG. 2 illustrates an example traffic path of a data packet as the data packet travels from an originating device to a recipient device.

FIG. 2 illustrates an example traffic path of a data packet as the data packet travels from an originating device 204 to a recipient device 208. The network arrangement 200 of FIG. 2 also depicts how a network appliance 202 can receive data packets from devices and/or applications (collectively referred to as "nodes") in a computer network 210. For example, the network appliance 202 may receive an optical signal that is delivered by a fiber optic cable connected to an external port of the network appliance 202. The nodes (e.g., switches 206a, 206d and routers 206b, 206c) couple the originating device 204 to the recipient device 208 and allow data packets to be transmitted between the originating device 204 and the recipient device 208. Examples of nodes include switches, routers, and network taps.

The network appliance 202 and the network tool 212 shown in FIG. 2 are both deployed as inline devices (i.e., within the flow of network traffic). In some embodiments, although the transmission paths connecting the network appliance 202 and the tool 212 are half duplex wires (i.e., only transmit information in one direction), full duplex wires capable of transmitting signals in both directions could also be used for some or all of the transmission paths between nodes of the computer network 210.

Upon receiving a data packet from node 206b, the network appliance 202 determines whether it is currently in pass-through mode or bypass mode. If the network appliance 202 is in pass-through mode, the network appliance 202 forwards the data packet downstream along a pass-through traffic path (shown by the dashed line) for further processing. For example, a switching fabric of the network appliance 202 may identify a policy for how the data packet is to be handled. The policy may be specified by a flow map that is selected from a group of flow maps based on one or more characteristics of the data packet. The characteristic(s) could include the communication protocol of which the data packet is a part (e.g., HTTP, TCP, IP) or a session feature (e.g., a timestamp). Additionally or alternatively, the proper flow map could be identified based on the network port (of the network appliance 202) on which the data packet was received, or the source node from which the data packet was received.

Often, the data packet is passed (e.g., by a processor of the network appliance 202) to an egress port for transmission downstream to a network tool (e.g., a monitoring and/or security-related tool). For example, the flow map may specify that the data packet is to be passed by the network appliance 202 to an egress port (also referred to as a "tool port" when connected to a tool) for transmission downstream to tool 212. The network appliance 202 may aggregate or modify the data packet in accordance with the policy specified by the flow map before passing the data packet to an egress port for transmission downstream to tool 212. In some embodiments, the network appliance 202 includes multiple egress ports, each of which is coupled to a different network tool or node within the computer network 210.

However, if the network appliance 202 is in the bypass mode, the network appliance 202 passes the data packet along a bypass traffic path (shown by the solid line). The bypass traffic path causes the data packet to be forwarded directly to an egress port for transmission downstream to another node (e.g., node 206c), thereby bypassing the switching fabric of the network appliance 202. In such embodiments, the network appliance 202 allows the data packet to traverse the bypass traffic path unimpeded and forwards the data packet without modification.

The network appliance 202 may normally operate in the pass-through mode. In that case, upon detecting an interruption to network connectivity, the network appliance 202 may move into bypass mode and establish the bypass traffic path. The interruption could be caused, for example, by a security threat or power loss (which makes it impossible for the switching fabric to properly route incoming data packets). After the interruption has been addressed or remedied, the network appliance 202 may attempt to return to the pass-through mode.

Figure 3:
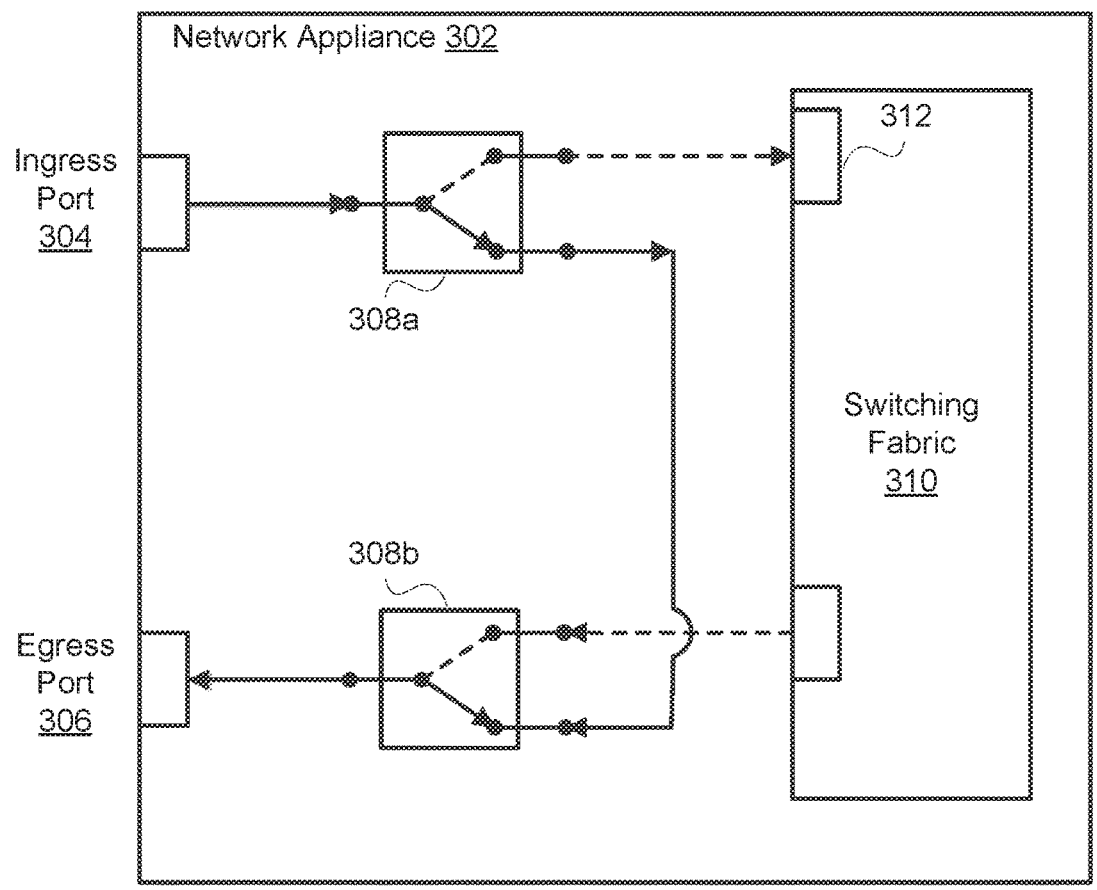
FIG. 3 depicts how a conventional inline network appliance switches from bypass mode to pass-through mode.

FIG. 3 depicts how a conventional inline network appliance 302 switches from bypass mode to pass-through mode. More specifically, FIG. 3 depicts how the network appliance 302 can direct an optical signal from an ingress port 304 to an egress port 306 along a bypass traffic path (shown by the solid line) or a pass-through traffic path (shown by the dashed line). The conventional inline network appliance 302 includes multiple optical switches 308a, 308b (also referred to as "relays") that are coupled to the ingress port 304 and the egress port 306. The optical switches 308a, 308b could include, for example, single-pole, double-throw (SPDT) relays that include a common terminal that connects to either of two other terminals.

Optical switches are conventionally used in pairs to either pass the network traffic through the network appliance (i.e., along the pass-through data path) or simply bypass the network traffic away from the conventional inline network appliance 302 (i.e., along the bypass data path). When the conventional inline network appliance 302 determines that the traffic path should be changed from the bypass traffic path to the pass-through traffic path (i.e., from the solid line to the dashed line), both optical switches 308a, 308b are switched. However, this causes the traffic flow to be disrupted and data packets within the optical signal to be lost.

As noted above, the loss consists of two different segments, a physical loss and a logical loss. The physical loss is caused by the physical delay of the optical switches 308a, 308b themselves when they disengage from an existing traffic path and engages a new traffic path. After the new traffic path is physically established within the conventional inline network appliance 302, the optical signal reaches an internal port 312 of the switching fabric 310. But the switching fabric 310 does not immediately forward the optical signal (e.g., downstream to a tool in accordance with a flow map) because the logical connectivity state of the internal port 312 is still classified as "disconnected." The conventional inline network appliance 302 does not change the logical connectivity state of the internal port 312 to "connected" until the optical signal reaches the internal port 312 and the conventional inline network appliance 302 has verified the data packets within the optical signal. After the logical connectivity state of the internal port 312 has been changed to "connected," the switching fabric can begin forwarding some or all of the data packets within the optical signal appropriately.

Network traffic that arrives at the internal port 312 during this timeframe are dropped and not forwarded downstream by the switching fabric 310. Note, however, that the logical loss described here is only incurred when the conventional inline network appliance 302 switches from the bypass traffic path to the pass-through traffic path because the node connected to the egress port 306 is never isolated from the bypass traffic path. Because the network traffic dropped due to logical loss is not recoverable and often contributes significantly to the total loss, it is desirable to eliminate the logical loss incurred by conventional inline network appliances when switching from the bypass state to the pass-through state.

Figure 4:
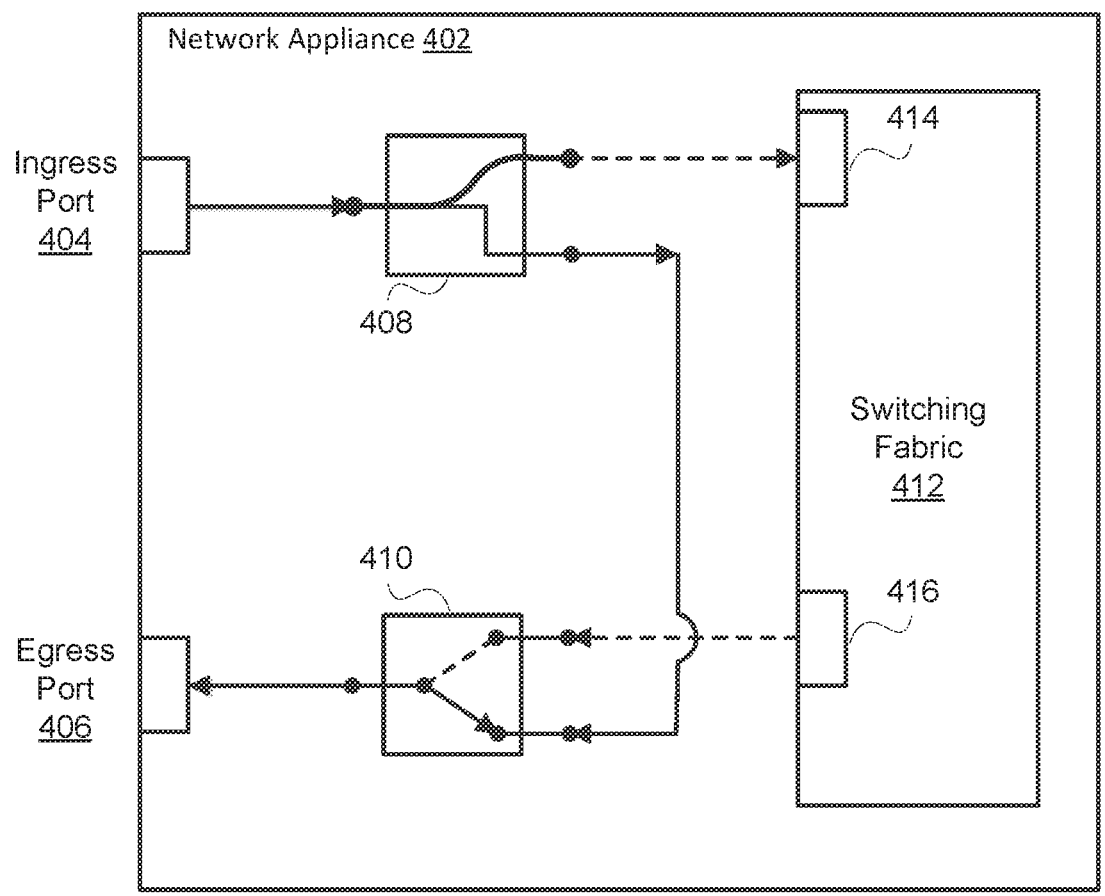
FIG. 4 depicts how an inline network appliance switches from the bypass traffic path to the pass-through traffic path in accordance with the techniques introduced herein.

FIG. 4 depicts how an inline network appliance 402 switches from the bypass traffic path to the pass-through traffic path in accordance with the techniques introduced herein. In order to eliminate the logical loss caused by network connectivity gaps, the logical connectivity state of the inline network appliance 402 must be kept active as if the circuit is fully connected (i.e., as if the pass-through traffic path is always connected), even though no data packets are forwarded downstream by the switching fabric 412 when an optical switch would normally bypass the switching fabric 412 (and other internal circuitry) of the inline network appliance 402.

Rather than use an optical switch for switching the network traffic path on both the reception end (i.e., at the ingress port 404) and the transmission end (i.e., at the egress port 406), the inline network appliances described herein utilize an optical signal splitter 408 to split the optical signal received at the ingress port 404. Moreover, the optical signal splitter 408 (also referred to as an "optical signal bleeder") can continuously feed a portion of the optical signal to an internal port 414 of the switching fabric 412 of the inline network appliance 402. Thus, the optical signal splitter 408 directs one portion of the optical signal along the pass-through traffic path (shown by the dashed line) and another portion of the optical signal along the bypass traffic path (shown by the solid line). Each portion represents an identical copy of the data packets within the optical signal having different power intensities.

Because the optical signal splitter continuously feeds a portion of the optical signal to the internal port 414 of the switching fabric 412, the network appliance 402 can continually monitor the logical connectivity state of the internal port 414 regardless of whether the inline network appliance 402 is in pass-through mode or bypass mode. The inline network appliance 402 can also monitor the logical connectivity state of the internal power 414 without returning a signal along the pass-through traffic path. Consequently, the logical connectivity state of the internal port 414 (and of the network appliance 402 as a whole) can be established in listen-only mode. For example, after the logical connectivity state has been established, the network appliance 402 can operate in listen-only mode and the network traffic may be passed downstream (e.g., to a tool port for transmission to a network tool) even when the network traffic path is still in bypass mode.

The inline network appliance 402 may be prohibited from passing network traffic to the internal port 414 while the logical connectivity state is being established and while the pass-through traffic path is (logically) established with the internal port 414. Although a portion of the optical signal will continue to be passed to the internal port 414 by the optical signal splitter 408, the network traffic represented by the portion of the optical signal may not be forwarded by the switching fabric 412 until the logical connectivity state is set to "connected," which eliminates the logical loss that typically accompanies a switch from the bypass traffic path to the pass-through traffic path.

After the pass-through traffic path is (logically) established from the optical signal splitter 408 to the internal port 414 of the switching fabric, an optical switch 410 completes the pass-through traffic path by physically connecting to another internal port 416 of the switching fabric 412. The optical switch 410 can be engaged once the inline network appliance 402 has completely established the pass-through traffic path from the ingress port 404 to an external tool coupled to the switching fabric 412. After establishing the pass-through traffic path in its entirety, the modifications described above can be reverted back to the normal operating mode and network traffic transmission can be resumed in one or more directions along the pass-through traffic path. Such a configuration allows logical loss (which is caused by the process that establishes the logical connectivity state) to be substantially or entirely eliminated because the establishment process can be performed while the network traffic path is in the bypass mode. Consequently, the network traffic can continue to be directed along the bypass traffic path until the inline network appliance has determined the switching fabric 412 is ready to handle incoming network traffic. Both the optical switch 410 and the optical signal splitter 408 generally reside within the housing of the network appliance 402.

Figure 5:
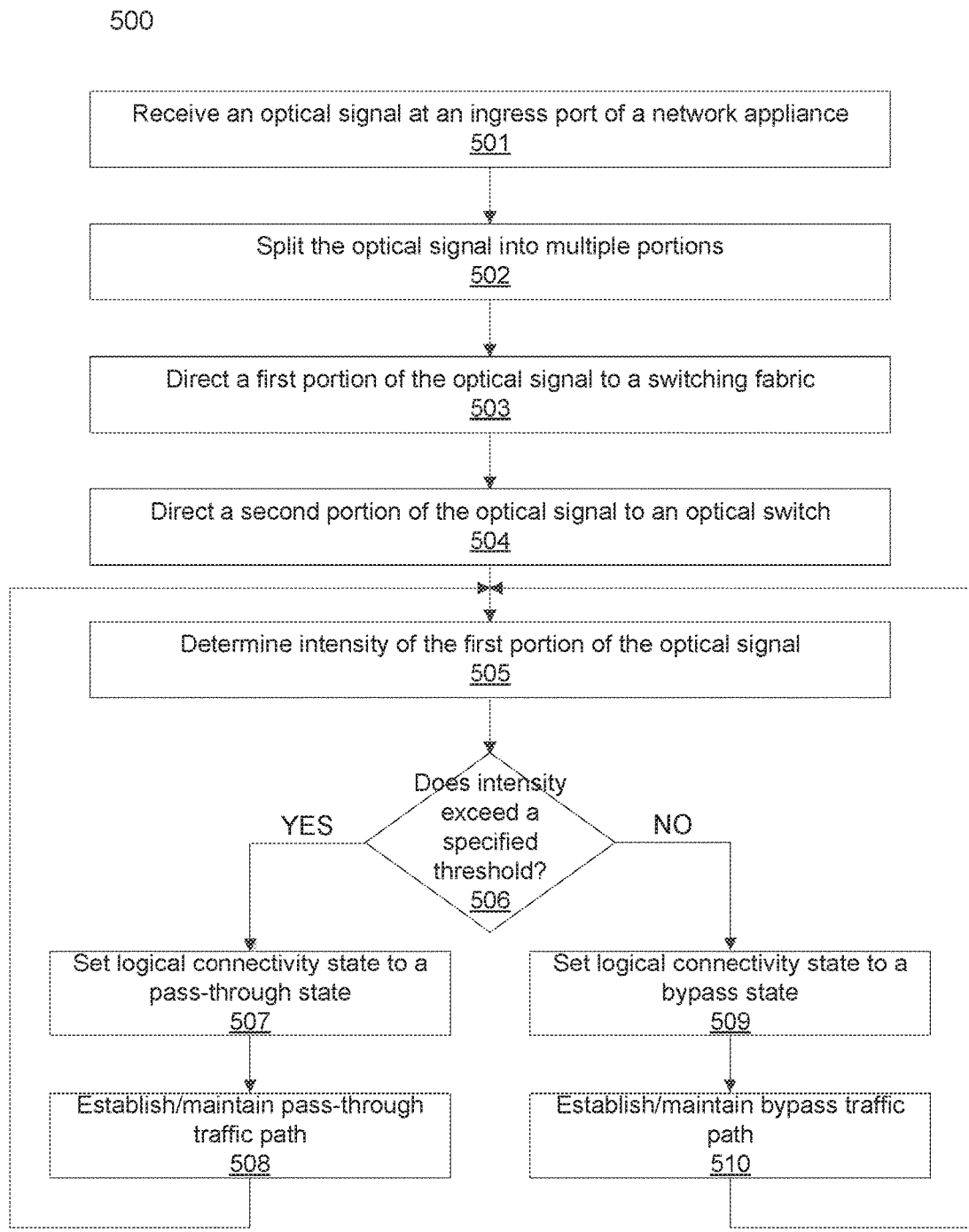
FIG. 5 depicts a process in which an inline network appliance continually monitors the logical connectivity state of the internal circuitry (e.g., the switching fabric).

FIG. 5 depicts a process 500 in which an inline network appliance continually monitors the logical connectivity state of the internal circuitry (e.g., the switching fabric). As noted above, the inline network appliance could route incoming optical signals along two different traffic paths, a bypass traffic path and a pass-through traffic path. The inline network appliance may have chosen to establish the bypass traffic path for several reasons. For example, if the inline network appliance loses power, the bypass traffic path is established to avoid creating a connectivity gap within a computer network that causes network traffic to be lost.

An optical signal is initially received at an ingress port of the inline network appliance (step 501). For example, the optical signal may be carried by a fiber optic cable that is connected to the ingress port. The optical signal is then split into multiple portions that represent identical copies of the data packets within the optical signal (step 502). An optical signal splitter (e.g., a 3-port fiber optic splitter) can split the incoming optical signal into any of various ratios (e.g., 90%-10%, 70%-30%, or 50%-50%). For example, a 70%-30% optical signal splitter having a 50 µW optical signal as input would output two separate, identical signals having power intensities of 15 µW and 35 µW (without accounting for any loss that is inherent to the optical signal splitter).

A first portion of the optical signal is directed to an internal port of a switching fabric (step 503), while a second portion of the optical signal is directed to an optical switch (step 504). Generally, the first portion of the optical signal will have a lower power intensity than the second portion of the optical signal. The inline network appliance (and, more specifically, the switching fabric) can continually monitor the power intensity of the first portion of the optical signal (step 505). For example, the inline network appliance would expect to the first portion to have a certain power intensity (e.g., 15 µW); however, if the inline network appliance loses power, the observable power intensity will be 0 µW from the perspective of the switching fabric. While the first portion of the optical signal will continue to be directed to the unpowered switching fabric by the optical signal splitter, the unpowered switching fabric will be unable to determine the power intensity of the first portion of the optical signal.

The inline network appliance) determines whether the power intensity measured by the switching fabric exceeds a specified minimum threshold (step 506). The specified upper threshold can be set, for example, at or near the certain power intensity that would normally be expected (e.g., 12 µW) for operation in pass-through mode. While power intensities are used here for the purposes of illustration, other statuses or signals may also be monitored or measured by the inline network appliance, such as the presence or strength of an incoming optical signal (e.g., a carrier signal), the presence or strength of a synchronization signal, etc.

If the power intensity exceeds the specified upper threshold, the inline network appliance will recognize that it should be in the pass-through mode. The inline network appliance therefore establishes a pass-through traffic path if the inline network appliance is currently in bypass mode or maintains the pass-through traffic path if the inline network appliance is already in pass-through mode (step 508). The inline network appliance can establish the pass-through traffic path by switching an optical switch that is coupled to an egress port of the inline network appliance. Switching of the optical switch is the last step to completing the pass-through traffic path. In some embodiments, the inline network appliance also sets the logical connectivity state to a pass-through state (step 507) and stores the logical connectivity state within a memory of the inline network appliance.

However, if the power intensity falls below the specified upper threshold, the inline network appliance will recognize that it should be in the bypass mode. The inline network appliance therefore establishes a bypass traffic path if the inline network appliance is currently in pass-through mode or maintains the bypass traffic path if the inline network appliance is already in bypass mode (step 510). The inline network appliance can establish the bypass traffic path by switching the optical switch. In some embodiments, the inline network appliance also sets the logical connectivity state to a bypass state (step 509) and stores the logical connectivity state within the memory of the inline network appliance.

User intention may also drive which traffic path is active at a given time. For instance, an administrator may specify the bypass traffic path is to be used by a network appliance by default unless the administrator elects to use the pass-through traffic path. Similar to other administrator decisions for the network appliance, this decision can be saved and restored. Accordingly, in some embodiments the network appliance could identify the default user intention. This step could be performed in addition to, or in place of, step 506. If the default user intention is the bypass traffic path, the network appliance can perform steps 509 and 510. However, if the default user intention is the pass-through traffic path, the network appliance must determine whether the pass-through traffic path is ready to be used. If so, the network appliance can perform steps 507 and 508; otherwise, the network appliance may perform steps 509 and 510.

Figure 6:
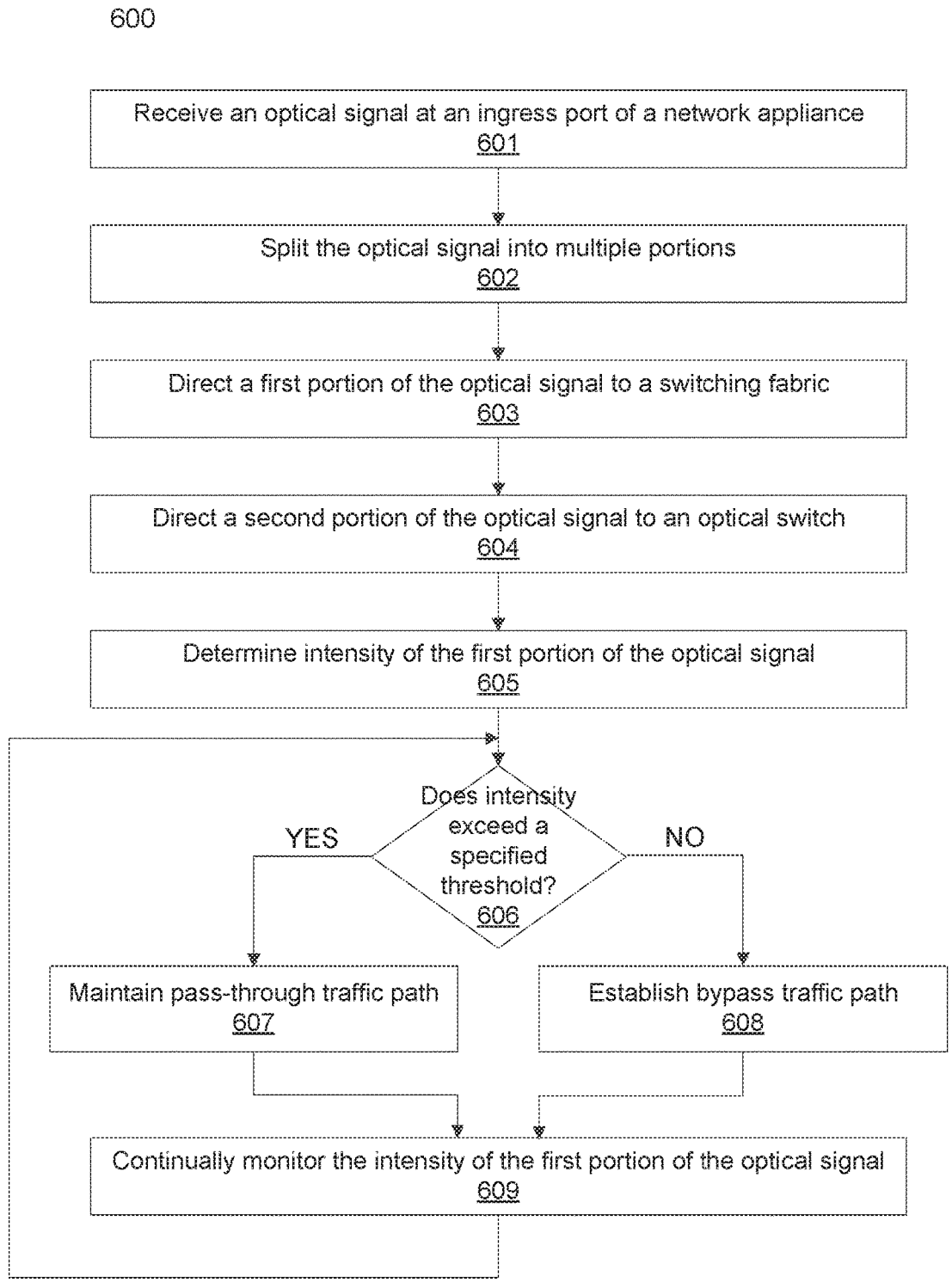
FIG. 6 depicts a process in which an inline network appliance switches from a bypass traffic path to a pass-through traffic path without experiencing logical loss due to gaps in network connectivity.

FIG. 6 depicts a process 600 in which an inline network appliance switches from a bypass traffic path to a pass-through traffic path without experiencing logical loss due to gaps in network connectivity. Steps 601-604 are substantially similar to steps 501-504 of FIG. 5.

In some embodiments, the inline network appliance determines the power intensity of the first portion of the optical signal received by the switching fabric (step 605) and compares the measured power intensity to a specified lower threshold. For example, the inline network appliance would normally expect the first portion to have a certain power intensity (e.g., 15 µW); however, if the inline network appliance loses power, the observable power intensity will be 0 µW from the perspective of the switching fabric. While the first portion of the optical signal will continue to be directed to the unpowered switching fabric by the optical signal splitter, the unpowered switching fabric will be unable to determine the power intensity of the first portion of the optical signal.

Accordingly, the inline network appliance determines whether the power intensity of the first portion of the optical signal exceeds a specified lower threshold (e.g., 1 µW) that allows the inline network appliance to readily determine power has been lost (step 606).

If the power intensity exceeds the specified lower threshold, the inline network appliance maintains a pass-through traffic path (step 607). Often, the pass-through traffic path will be the default arrangement for the inline network appliance. The pass-through traffic path causes some or all of the network traffic within the optical signal to be forwarded downstream (e.g., to a tool) for further processing. However, if the power intensity falls below the specified lower threshold, the inline network appliance recognizes that all or substantially all power has been lost and establish the bypass traffic path (step 608). By establishing the bypass traffic path, the inline network appliance avoids causing a gap in network connectivity. The inline network appliance then continually monitors the power intensity of the first portion of the optical signal (step 609) and repeats the above process to seamlessly switch between the bypass and pass-through traffic paths without experiencing disruption.

Similar to process 500 of FIG. 5, user intention may drive which traffic path is active at a given time. Accordingly, in some embodiments the network appliance could determine the default user intention and then, based on the determination, decide whether to perform step 607 or step 608.

Unless contrary to physical possibility, it is envisioned that the steps described above may be performed in various sequences and combinations. Other steps could also be included in some embodiments.

Processing System

Figure 7:
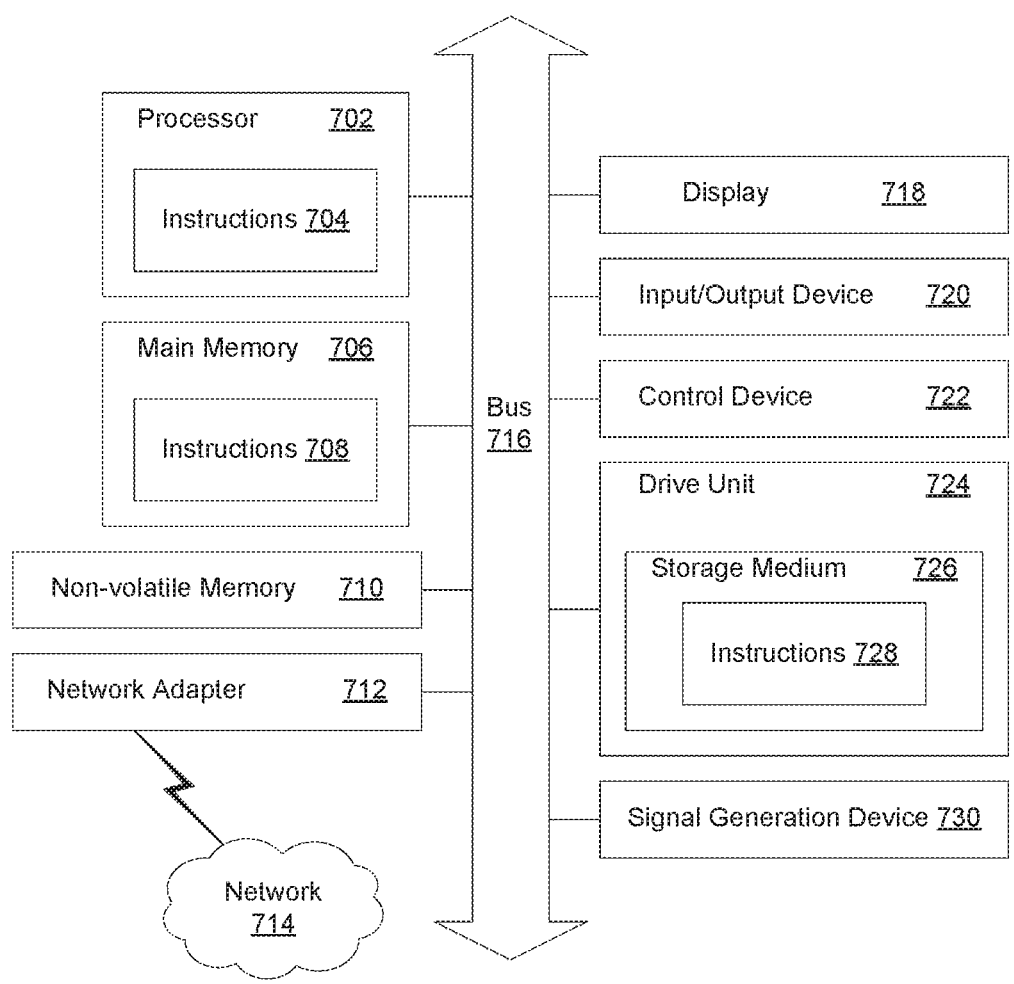
FIG. 7 is a high-level block diagram illustrating an example of a processing system in which at least some operations described herein can be implemented.

FIG. 7 is a block diagram illustrating an example of a processing system 700 in which at least some operations described herein can be implemented. For example, the processing system 700 may be responsible for generating an interface through which an administrator manually specifies the upper/lower threshold or which traffic path should be active at a given time. As another example, at least a portion of the processing system 700 may be included in a network appliance (in that case, the processing system 700 may not include a display 718, but could instead include a switching fabric and one or more network ports). The computing system may include one or more central processing units ("processors") 702, main memory 706, non-volatile memory 710, network adapter 712 (e.g., network interfaces), display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents any one or more separate physical buses, point to point connections, or both connected by appropriate bridges, adapters, or controllers. The bus 716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 700 operates as a standalone device, although the processing system 700 may be connected (e.g., wired or wirelessly) to other machines. For example, the processing system 700 may include a terminal that is coupled directly to a network appliance. As another example, the computing system 700 may be wirelessly coupled to the network appliance.

In various embodiments, the processing system 700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 706, non-volatile memory 710, and storage medium 726 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 704, 708, 728) set at various times in various memory and storage devices in a computer, and that, when read and executed by one or more processing units or processors 702, cause the processing system 700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 710, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 712 enables the processing system 700 to mediate data in a network 714 with an entity that is external to the processing system 700, such as a network appliance, through any known and/or convenient communications protocol supported by the processing system 700 and the external entity. The network adapter 712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving an optical signal at an ingress port of a network appliance;
   splitting the optical signal into a first portion and a second portion;
   directing the first portion of the optical signal to a switching fabric along a pass-through traffic path; and
   directing the second portion of the optical signal to an optical switch along a bypass traffic path,
      wherein the optical switch is coupled to an egress port of the network appliance.

2. The method of claim 1, further comprising:
   monitoring power intensity of the first portion of the optical signal; and
   engaging, by the optical switch based on said monitoring, the pass-through traffic path or the bypass traffic path.

3. The method of claim 2, further comprising:
   configuring a logical connectivity state of the network appliance as bypass or pass-through based on a currently engaged traffic path; and
   storing the logical connectivity state in a memory accessible to the network appliance.

4. The method of claim 2, wherein said engaging comprises:
   responsive to a determination that the power intensity of the first portion of the optical signal exceeds a specified threshold,
      engaging, by the optical switch, the pass-through traffic path to receive at least some of the first portion of the optical signal from the switching fabric; and
   responsive to a determination that the power intensity of the first portion of the optical signal falls below the specified threshold,
      engaging, by the optical switch, the bypass traffic path to receive the second portion of the optical signal directly from an optical splitter.

5. The method of claim 4, further comprising:
   transmitting the at least some of the first portion of the optical signal or the second portion of the optical signal from the egress port of the network appliance to a destination node.

6. The method of claim 1, wherein the first and second portions of the optical signal represent identical copies of the optical signal having different power intensities.

7. A method comprising:
   monitoring a power level of a first portion of an optical signal directed from an optical splitter to a switching fabric; and
   causing an optical switch to
      engage a pass-through traffic path to receive at least some of the first portion of the optical signal from the switching fabric responsive to a determination that the power level has exceeded a specified threshold, and
      engage a bypass traffic path to receive a second portion of the optical signal directly from the optical splitter responsive to a determination that the power level has fallen below the specified threshold.

8. The method of claim 7, further comprising:
   determining a logical connectivity state of the network appliance based on the power level; and
   storing the logical connectivity state in a memory accessible to the network appliance.

9. The method of claim 7, wherein the pass-through traffic path is established from the optical splitter to the optical switch via the switching fabric.

10. The method of claim 7, wherein said monitoring comprises:
    establishing a logical connectivity state of the network appliance indicative of a currently engaged traffic path in listen-only mode.

11. The method of claim 7, further comprising:
    filtering noise from the first portion of the optical signal; and
    amplifying the power level of the first portion of the optical signal.

12. The method of claim 7, further comprising:
    transmitting the at least some of the first portion of the optical signal or the second portion of the optical signal from the egress port of the network appliance to a destination node.

13. The method of claim 7, wherein the switching routine is executed in real time to reduce loss of network traffic when the bypass traffic path is switched to the pass-through traffic path, or vice versa.

14. A network appliance comprising:
    an ingress port through which to receive an optical signal from an originating node;
    an egress port through which to forward at least some of the optical signal to a destination node; and
    a signal splitter configured to
       split the optical signal into a first portion and a second portion,
       direct the first portion of the optical signal to a switching fabric along a pass-through traffic path, and
       direct the second portion of the optical signal to an optical switch along a bypass traffic path.

15. The network appliance of claim 14, wherein the signal splitter is a multi-port fiber optic splitter.

16. The network appliance of claim 14, wherein the switching fabric is responsible for determining how network traffic included in the optical signal is to be handled.

17. The network appliance of claim 14, wherein the signal splitter is coupled between the ingress port and the switching fabric, and wherein the optical switch is coupled between the egress port and the switching fabric.

18. The network appliance of claim 14, further comprising:
- a processor configured to:
  - monitor a power intensity of the first portion of the optical signal; and
  - executing a switching routine that enables the optical switch to
    - engage the pass-through traffic path to receive at least some of the first portion of the optical signal from the switching fabric responsive to a determination that the power intensity has exceeded a specified threshold, and
    - engage the bypass traffic path to receive the second portion of the optical signal from the signal splitter responsive to a determination that the power intensity has fallen below the specified threshold.

19. The network appliance of claim 18, wherein the switching fabric is configured to transmit the first portion of the optical signal to a tool for processing when the pass-through traffic path is engaged.

20. The network appliance of claim 18, wherein the processor is further configured to:
- determine a logical connectivity state of the network appliance based on the power intensity; and
- store the logical connectivity state in a memory accessible to the network appliance.

* * * * *